W. J. BODA.
Extension-Table Slide.

No. 162,890.  Patented May 4, 1875.

WITNESSES:
Jas. E. Hutchinson
John R. Young

INVENTOR.
Wm. J. Boda, by
Prindle and Co. his Attys

UNITED STATES PATENT OFFICE.

WILLIAM J. BODA, OF DAYTON, OHIO, ASSIGNOR TO HIMSELF AND ABIA Z. BODA, OF SAME PLACE.

IMPROVEMENT IN EXTENSION-TABLE SLIDES.

Specification forming part of Letters Patent No. 162,890, dated May 4, 1875; application filed October 12, 1874.

*To all whom it may concern:*

Be it known that I, WILLIAM J. BODA, of Dayton, in the county of Montgomery and in the State of Ohio, have invented certain new and useful Improvements in Extension-Table Slides; and do hereby declare that the following is a full, clear, and exact description thereof, reference being had to the accompanying drawing, making a part of this specification, in which—

Figure 1:
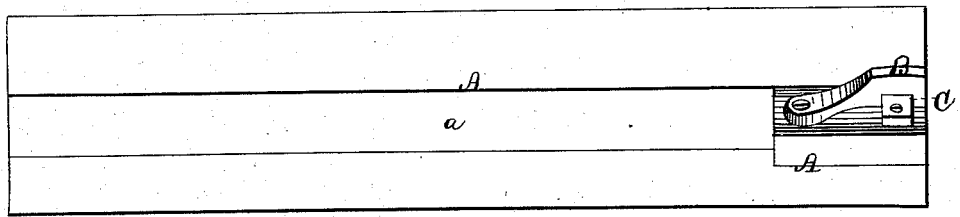
Figure 1:
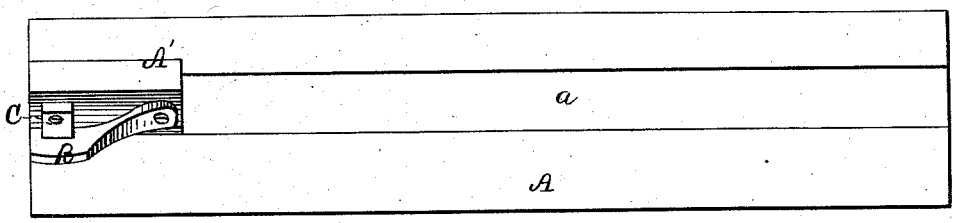
Figure 2:
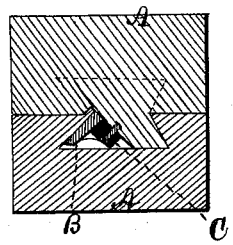

Figure 1 is a plan view of the inner or bearing faces of my improved slide, and Fig. 2 is a cross-section upon line $x$ $x$ of Fig. 1.

Letters of like name and kind refer to like parts in each of the figures.

The design of my invention is to render more perfect the operation of the slides of extension-tables; to which end it consists in a slide having within each section a dovetail groove, which receives a dovetail tenon that is attached to the opposite section, said tenon having one of its bearing-faces formed by a yielding metal bar, substantially as and for the purpose hereinafter specified.

In the annexed drawing, A represents a wooden bar, provided within one face with a dovetail groove, $a$, which extends from one end to a point near its opposite end, where is formed a tenon, A', that has upon one side a dovetail shape, so that when said bar is placed against a similar bar, said tenon shall fit within the groove of said opposite bar, and have bearings upon one side and the bottom of said groove, as seen in Fig. 2. The rear side of each half-tenon A' is formed upon a line which has a right angle to the contiguous angular face of the groove $a$, within which it fits, and upon said rear side is pivoted one end of a metal bar, B, the opposite outer end of which latter is flattened, has a line transversely with said groove face, and bears upon or against the same, said bar B thus completing the dovetail form of said tenon. Upon the rear side of the bearing end of the bar B a spring, C, is secured to or upon the tenon A', and, bearing against said bar, holds the latter in close contact with the contiguous face of the groove $a$. The slides are now arranged with the solid faces of their tenons uppermost, in which position said faces sustain the strain thrown upon said slide, and keep its sections in a line with each other, while the pivoted bars or yielding spring-faces operate to maintain the contact between said solid faces and the contiguous faces of the grooves, and compensate for any wear that is caused by use.

In use, no sagging can occur at the center of the slides, for the reason that the solid bearings of the tongues sustain all weight, the bowing upward of said slides is prevented by the action of the springs C upon the yielding faces of said tongues, while all looseness and rattling is avoided by the action of said springs, which cause a constant and sufficient, but not tight, contact to be maintained at all times between the bearing-faces.

Having thus fully set forth the nature and merits of my invention, what I claim as new is—

The combination of the slides A and A, provided each with a dovetail groove, $a$, half dovetail tenon A', pivoted bar B, and spring C, substantially as and for the purpose specified.

In testimony that I claim the foregoing I have hereunto set my hand this 3d day of October, 1874.

WM. J. BODA.

Witnesses:
PATRICK H. GUNCKEL,
EDWARD L. ROWE.